United States Patent [19]

Trieschmann et al.

[11] 3,903,203

[45] Sept. 2, 1975

[54] ALPHA-OLEFIN POLYMER AND 0.05-1.0 PERCENT VINYL AROMATIC POLYMER

[75] Inventors: Hans-Georg Trieschmann, Hambach, Germany; Helmut Pfannmueller, Brasschaat, Antwerp, Belgium; Friedrich Urban, Limburgerhof, Germany; Oskar Buechner, Ludwigshafen, Germany; Karl-Heinz Fauth, Frankenthal, Germany; Volker Gierth, Ludwigshafen, Germany; Klaus Pfleger, Wesseling, Germany

[73] Assignee: Badische Anilin- & Soda-Fabrik Aktiengesellschaft, Ludwigshafen (Rhine), Germany

[22] Filed: Nov. 5, 1973

[21] Appl. No.: 404,283

Related U.S. Application Data

[63] Continuation of Ser. No. 190,370, Oct. 18, 1971, abandoned.

[30] Foreign Application Priority Data

Oct. 17, 1970 Germany.............................. 2051024

[52] U.S. Cl.......... 260/897 B; 260/876 R; 260/887; 260/897 A
[51] Int. Cl........................ C08f 19/18; C08f 37/18
[58] Field of Search........ 260/897 B, 897 R, 897 A, 260/898

[56] References Cited
UNITED STATES PATENTS

| | | | |
|---|---|---|---|
| 3,218,373 | 11/1965 | Salyer............................. | 260/897 B |
| 3,249,570 | 5/1966 | Potts.............................. | 260/897 B |
| 3,350,372 | 10/1967 | Anspon et al.................... | 260/897 B |

*Primary Examiner*—John C. Bleutge
*Assistant Examiner*—J. Ziegler
*Attorney, Agent, or Firm*—Johnston, Keil, Thompson & Shurtleff

[57] ABSTRACT

Film having improved transparency prepared from a mixture of an ethylene polymer and from 0.05 to 1.0 percent by weight (based on the mixture) of a copolymer of styrene, a graft copolymer of styrene, a homopolymer of propylene or a copolymer of propylene and ethylene; the film may be used as packaging material.

4 Claims, No Drawings

ALPHA-OLEFIN POLYMER AND 0.05-1.0 PERCENT VINYL AROMATIC POLYMER

This is a continuation, of application Ser. No. 190,370, filed 10-18-71, which application has now been abandoned.

The invention relates to plastics film or sheeting having improved transparency prepared from polymers or copolymers of ethylene or from mixtures of these polymers or copolymers.

It is known that the transparency of film (which in the context of the present specification includes sheeting) prepared from polyethylene or copolymers of ethylene and other monomers may be fairly low. This is especially the case with film prepared from copolymers of ethylene when the copolymer is built up from ethylene and a comonomer whose copolymerization parameter differs considerably from that of ethylene and when the copolymer has been prepared in a tubular reactor. Comonomers whose copolymerization behavior deviates markedly from the ideal particularly acrylic acid, methacrylic acid, maleic acid and fumaric acid and their derivatives, as for example esters, amides, N-substituted amides and anhydrides. Although attempts have already been made to improve the transparency of polyethylene film by adding small amounts of metal bronzes in finely divided form to the composition used for the production of the same, it has been found that the metal particles incorporated promote oxidative degradation processes so that the properties of such film deteriorate in time.

It is an object of the present invention to provide film prepared from polymers or copolymers of ethylene or from mixtures of these polymers or copolymers which is distinguished by high transparency without the other properties of the film being inferior.

The new film contains 0.05 to 1 percent by weight of a thermoplastic which melts at from 100° to 170°C and preferably at from 120° to 170°C incorporated therein.

Particularly suitable thermoplastics are polymers of styrene or copolymers or graft copolymers of styrene and acrylonitrile, dienes as for example butadiene-1,3, acrylic acid, methacrylic acid, esters of acrylic acid and methacrylic acid which have been derived from alcohols having one to eight carbon atoms, polymers of styrene which contain polymerized units of two or more of the said monomers, for example those known as ABS polymers (polymers of acrylonitrile, butadiene and styrene) and polypropylene and copolymers of propylene and ethylene which preferably contain from 1 to 50 percent by weight of polymerized units of ethylene. The melt index of the styrene polymers is within the range from 0.05 to 50 g/10 minutes, determined in accordance with DIN 53,735 (200°C, 5 kg).

The melt index of the propylene polymers is from 0.05 to 20 g/10 minutes (230°C/2.16 kg) determined in accordance with ASTM D 1238-65T. The choice of the most suitable plastic in any given case depends primarily on its compatibility with the remaining film materials. Thus propylene polymers and copolymer of ethylene and propylene are particularly suitable as additives to improve transparency in the case of polyethylene film whereas in the case of film of ethylene copolymers with polar monomers it is styrene polymers and copolymers and graft copolymers of styrene which give particularly good results.

For the copolymers of ethylene with polar monomers it is preferred to use copolymers of styrene and acrylonitrile which contain from 23 to 38 percent by weight of acrylonitrile in polymerized form. The copolymers and graft copolymers of styrene may contain the above-mentioned monomers in amounts of from 5 to 45 percent by weight in polymerized form. When the sytrene polymers contain units of two or more of the said monomers, the styrene content is at least 40 percent by weight. The ABS polymers contain from 5 to 45 percent by weight of butadiene as a rule. Similar statements apply for graft copolymers as for copolymers.

The said thermoplastics are added in amounts of from 0.05 to 1 percent by weight to polyethylene, copolymers of ethylene with acrylic acid, methacrylic acid, fumaric acid and maleic acid and their derivatives such as esters, anhydrides, amides and N-substituted amides to improve the transparency of film made from these plastics. Among the said polymers, special prominence should be given to copolymers of ethylene and acrylic or methacrylic acid esters which are derived from alcohols having one to ten carbon atoms. The ethylene copolymers may also contain two or more of the said monomers as polymerized units, for example they may be copolymers of ethylene, acrylic acid and an acrylate. The melt index of the polymers which form the backbone of the film is from 0.05 to 15 g/10 minutes, preferably from 0.8 to 7 g/10 minutes, according to ASTM D 1238 (190°C, 2.16 kg). The ethylene copolymers should contain at least 50 percent by weight of polymerized units of ethylene.

Film in accordance with the invention may be made by the methods conventionally used in the film-making industry, particularly by the blow molding method or by means of sheeting dies. The thickness of the film may be from 8 to 400, preferably from 15 to 200, microns.

It is important that the plastics which is to improve transparency should be distributed well in the material from which the film is to be made. It has proved to be advantageous first to prepare a preconcentrate of the ethylene polymer of copolymer which is to be processed into film and the additive which is to improve transparency, the preconcentrate containing from 40 to 80 percent, preferably 55 to 75 percent, by weight of the polyolefin component and consequently from 60 to 20 percent, preferably from 45 to 25 percent, by weight of the additive. This preconcentrate should be uniform and devoid of "fish-eyes."

The preconcentrate and the remaining film material are either premixed in mixing drums or supplied immediately prior to processing through a metering unit as for example belt scales, vibrating dosing chutes and the like to the processing apparatus. The proportions are adjusted so that the amount of added plastics in the product is from 0.05 to 1 percent by weight. The working temperature should advantageously be from 5° to 10°C above the upper limit of the melting range of the component having the higher melting point. Screw extruders the screws of which are equipped, for example with kneading elements, so that they make good homogenization possible have proved to be particularly suitable.

The material prepared in this way may be immediately processed into film. Passing the material more than once through the processing apparatus does not result in appreciable improvements over a single passage. The film is primarily used for packaging.

The homogenizing machine used in the following Examples is a twin-screw machine having a ratio of length:diameter of 32:1. Of the 32 diameter units, 4.5 are kneading elements. Heating/cooling elements are provided in five zones. The kneading elements are situated in the fourth zone. The first four zones are heated or cooled so that the temperature of the material in the fourth zone is advantageously 5° to 50°C above the upper limit of the melting range of the component having the higher melting point. References to temperatures are based on measurements carried out with a thermocouple on the inner wall of the barrel of this zone. Moreover the temperature of the melt at the outlet from the machine is determined by inserting a thermocouple. A three-part screen pack having 64, 1,600 and 64 meshes/cm² is provided at the head of the machine. The product is extruded through orifices having a width of 2.5 mm in the form of strands which are passed through a water-bath and then broken up in a mill.

References to Comparative Examples in the Tables relate to the same procedure with the sole exception that the component of higher melting point is not added.

The preconcentrates are prepared on the same machine as that in which the components are mechanically mixed and then metered to the feed section. The primary concentrate thus obtained is passed through the machine again twice and thus refined before it is used for improving transparency. Some of the refining steps may be omitted. The data given in the Examples are determined as follows:

density according to DIN 53,479/7.2
melt index according to ASTM D 1238 (190°C; 2.16 kg)
(unless otherwise stated)
haze value according to ASTM D 1003-61 and gloss according to ASTM D 2457-65 T (the method of determination being altered trivially by carrying out the measurement with a gloss meter of Dr B. Lange, Berlin with an angle of incidence and an angle of reflection of the light of 45°.

EXAMPLE 1

The materials used are:
a. a copolymer of ethylene and methyl methacrylate having the following properties: melt index 5.2 g/10 minutes, density 0.929 g/ccm, content of methyl methacrylate 9.7 percent by weight and
b. a polymer mixture of 60 percent by weight of (a) and 40 percent by weight of a polystyrene having a density of 1.05 g/ccm and a melt index of 9 g/10 minutes (measured according to DIN 53,735 at 200°C and 5 kg). The two components (a) and (b) are mixed in the ratio of 98.75 percent by weight of (a) and 1.25 percent by weight of (b), so that the styrene content in the end product is 0.5 percent by weight. The temperature in the fourth zone of the screw machine is 200°C and the temperature of the discharged material is 198°C.

| Properties | Example 1 | Comparative Example |
|---|---|---|
| gloss (scale divisions) | 90 | 24 |
| haze (%) | 5.9 | 20.3 |

EXAMPLE 2

Materials used:
a. a terpolymer of ethylene, acrylic acid and n-butyl acrylate having the following properties: melt index 6.4 g/10 minutes, density 0.935 g/ccm, content of acrylic acid 3.5 percent by weight, content of n-butyl acrylate 9.7 percent by weight and
b. a polymer mixture of 70 percent by weight of (a) and 30 percent by weight of a copolymer of styrene and acrylonitrile containing 25 percent by weight of acrylonitrile (density 1.08 g/ccm and melt index 0.7 g/10 minutes, measured according to DIN 53,735 at 200°C and 5 kg). The two components are mixed in the ratio of 99.06 percent by weight of (a) and 0.94 percent by weight of (b) so that the content of styrene polymer in the end product is 0.4 percent by weight. The temperature in the fourth zone of the screw machine is 185°C and the temperature in the effluent material is 190°C.

| Properties | Example 2 | Comparative Example |
|---|---|---|
| gloss (scale divisions) | 92 | 35 |
| haze (%) | 5.4 | 18.0 |

EXAMPLE 3

Material used:
a. a polyethylene having the following properties: melt index 1.5 g/10 minutes, density 0.920 g/ccm and
b. a polymer mixture of 65 percent by weight of (a) and 35 percent by weight of a polypropylene having a density of 0.896 g/ccm and a melt index of 0.2 g/10 minutes. The ratio of the two components in the mixture is 97.8 percent by weight of (a) to 2.2 percent by weight of (b) so that the content of polypropylene in the end product is 0.75 percent by weight. The temperature in the fourth zone of the screw machine is 173°C and the temperature in the extrudate is 180°C.

| Properties | Example 3 | Comparative Example |
|---|---|---|
| gloss (scale divisions) | 128 | 76 |
| haze (%) | 2.4 | 7.3 |

EXAMPLE 4

Materials used:
a. a polymer mixture of 50 percent by weight of a copolymer of ethylene and methyl methacrylate (melt index 5.2 g/10 minutes; density 0.929 g/ccm, content of methyl methacrylate 9.7 percent by weight) and 50 percent by weight of a copolymer of ethylene and tert-butyl acrylate (melt index 6.4 g/10 minutes; density 0.926 g/ccm; content of tert-butyl acrylate 12.2 percent by weight) and
b. a polymer mixture of 55 percent by weight of (a) and 45 percent by weight of a copolymer of styrene and acrylonitrile containing 35 percent by weight of acrylonitrile (density 1.08 g/ccm and melt index 1.5 g/10 minutes, measured according to DIN 53,735 at 200°C and 5 kg). The ratio of the two components in the mixture is 99.28 percent by weight of (a) to 0.72 percent by weight of (b), so that the content of styrene copolymer in the end product is 0.3 percent by weight. The temperature in the fourth zone of the screw machine is 165°C and the temperature in the extrudate is 170°C.

| Properties | Example 4 | Comparative Example |
|---|---|---|
| gloss (scale divisions) | 115 | 34 |
| haze (%) | 5.0 | 20.1 |

We claim:
1. Film having improved transparency prepared from a mixture consisting essentially of
   a. at least one polymer selected from the group consisting of polyethylene and a copolymer of ethylene, said copolymer containing polymerized units of at least one of the comonomers acrylic acid, alkyl acrylate and alkyl methacrylate, said copolymer containing at least 50 percent by weight of polymerized units of ethylene, and
   b. 0.05 to 1 percent by weight, with reference to the composition, of a polymer selected from the group consisting of polystyrene and a copolymer of styrene and acrylonitrile, said copolymer containing from 5 to 45 percent by weight of polymerized units of acrylonitrile.

2. Film as claimed in claim 1 wherein said component (b) is a copolymer of styrene and acrylonitrile, said copolymer containing from 23 to 38 percent of polymerized units of acrylonitrile.

3. Film as claimed in claim 1 wherein component (a) is a copolymer of ethylene and methyl methacrylate and component (b) is polystyrene.

4. Film as claimed in claim 1 wherein component (a) is a copolymer of ethylene, acrylic acid and n-butyl acrylate and component (b) is 0.05 to 1.0 percent by weight, based on the mixture, of a copolymer of styrene containing from 5 to 45 percent by weight of acrylonitrile units.

* * * * *